A. E. BROWN.
NUT-LOCK.
No. 178,834. Patented June 20, 1876.
Fig. 1.
Fig. 2. Fig. 3.
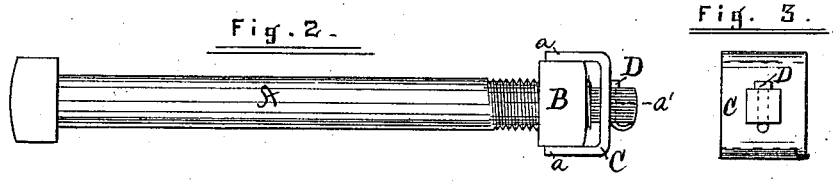 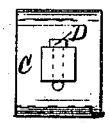
WITNESSES.
Jno. S. Carter
T. J. Roach
INVENTOR.
A. E. Brown
By H. N. Jenkins
ATTORNEY.

UNITED STATES PATENT OFFICE.

ALFRED E. BROWN, OF NEW ORLEANS, LOUISIANA.

IMPROVEMENT IN NUT-LOCKS.

Specification forming part of Letters Patent No. 178,834, dated June 20, 1876; application filed April 18, 1876.

*To all whom it may concern:*

Be it known that I, ALFRED EDMUND BROWN, a resident of the city of New Orleans and State of Louisiana, have invented a certain new and useful Improvement in Screw-Bolts; and I do hereby declare the following to be a full, clear, and correct description of the same, reference being had to the annexed drawing, making a part of this specification.

The object of my invention, as its name indicates, is to provide a cheap, simple, and reliable means for holding securely and immovably upon screw-bolts the nuts thereof.

My improvement will be readily understood by referring to the accompanying drawing, whereon Figure 1 represents an ordinary screw-bolt, the point of which is somewhat reduced in diameter and provided with a small hole, for purposes hereinafter indicated. Fig. 2 shows the bolt as when provided with its nut and my improved locking device. Fig. 3 is an end view of Fig. 2.

A is the bolt, a limited portion of the threaded end of which is cut down and provided with flat surfaces, so that a cross-section of the same may represent either a square, hexagon, or any other figure having flat surfaces. To the threaded portion of this bolt is fitted an ordinary nut, B, which is prevented, when screwed to its bearing, from turning or becoming loosened by a cap, C, which is provided in its center with a hole corresponding in size and configuration to that of the reduced end of the bolt upon which it is placed, so that its flanges $a$, projecting forward, may envelop the sides of the nut, which should be previously cut to fit neatly within the flanges of the cap, as though the latter were a wrench.

The aforesaid cap C, which may be provided with one or more flanges, is effectually held in position by means of a metal pin, D, which is inserted in the perforation $a'$, where it is held by bending back its point, as shown in the drawing.

It is obvious that the reduced end of the bolt may be cut in various forms, any of which would answer the same purpose. I therefore do not confine myself to any particular configuration of the same; but What I do claim as my invention is—

The screw-bolt A, having one or more reduced flattened surfaces at one end, and provided with a perforation, $a'$, nut B, cap C, provided with flanges $a$ $a$, and pin D, the whole constructed and arranged to operate substantially as described.

This specification signed this 8th day of April, 1876.

A. E. BROWN.

Witnesses:
J. C. HUBBELL,
JNO. S. CARTER.